(12) United States Patent
Poon et al.

(10) Patent No.: US 8,292,587 B2
(45) Date of Patent: Oct. 23, 2012

(54) TURBINE BLADE ASSEMBLIES AND METHODS OF MANUFACTURING THE SAME

(75) Inventors: Kin Poon, Tempe, AZ (US); Rajiv Rana, Phoenix, AZ (US); Bob Mitlin, Scottsdale, AZ (US); Ardeshir Riahi, Scottsdale, AZ (US); David Chou, Phoenix, AZ (US); Steve Halfmann, Chandler, AZ (US); Frank Mignano, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 903 days.

(21) Appl. No.: 12/338,746

(22) Filed: Dec. 18, 2008

(65) Prior Publication Data

US 2010/0158700 A1    Jun. 24, 2010

(51) Int. Cl.
*F01D 11/00* (2006.01)
(52) U.S. Cl. ............... 416/193 A; 415/115; 415/116; 416/90 R; 416/95; 416/96 R; 416/97 R; 416/193 R
(58) Field of Classification Search .......... 415/115, 415/116; 416/90 R, 92, 95, 96 R, 97 R, 193 R, 416/193 A
See application file for complete search history.

(56) References Cited

U.S. PATENT DOCUMENTS

| | | | |
|---|---|---|---|
| 3,647,311 A * | 3/1972 | Wootton et al. | 415/113 |
| 4,212,587 A * | 7/1980 | Horner | 416/96 R |
| 4,712,979 A | 12/1987 | Finger | |
| 5,800,124 A | 9/1998 | Zelesky | |
| 6,402,471 B1 | 6/2002 | Demers et al. | |
| 6,457,935 B1 | 10/2002 | Antunes et al. | |
| 6,719,529 B2 | 4/2004 | Tiemann | |
| 6,899,518 B2 | 5/2005 | Lucas et al. | |
| 6,923,616 B2 | 8/2005 | McRae, Jr. et al. | |
| 6,997,679 B2 | 2/2006 | Beddard et al. | |
| 7,001,141 B2 | 2/2006 | Cervenka | |
| 7,284,954 B2 | 10/2007 | Parker et al. | |
| 2005/0058545 A1 | 3/2005 | Cardenas | |
| 2006/0093484 A1 | 5/2006 | Liang | |
| 2008/0240927 A1 | 10/2008 | Bergander et al. | |

* cited by examiner

*Primary Examiner* — Robert Pascal
*Assistant Examiner* — Kimberly Glenn
(74) *Attorney, Agent, or Firm* — Ingrassia Fisher & Lorenz, P.C.

(57) ABSTRACT

A turbine blade assembly includes an airfoil, a platform, and a first cover plate. A center flow path extends through the platform in communication with an internal cooling circuit of the airfoil, which extends from a first side of the platform. A second side of the platform is located opposite the platform from the first side. An edge of the platform extends between the first and second sides and, a first passage is formed between the first and second sides and includes a first inlet and a first outlet. The first passage extends from the center flow path toward the platform edge, and a first groove is formed on the second side of the platform and extends from the first outlet of the first passage toward the edge of the platform. The first cover plate is disposed over the second side of the platform covering the first groove.

18 Claims, 7 Drawing Sheets

TURBINE BLADE ASSEMBLIES AND METHODS OF MANUFACTURING THE SAME

This inventive subject matter was made with Government support under F33615-03-D-2355 awarded by the United States Air Force. The Government has certain rights in this inventive subject matter.

TECHNICAL FIELD

The inventive subject matter generally relates to turbine rotors and more particularly relates to turbine blade assemblies for use in turbine rotors and methods of manufacturing the turbine blade assemblies.

BACKGROUND

Gas turbine engines, such as turbofan gas turbine engines, may be used to power various types of vehicles and systems, such as aircraft. Typically, these engines include turbines that rotate at a high speed when blades (or airfoils) extending therefrom are impinged by high-energy compressed air. Consequently, the blades are subjected to high heat and stress loadings which, over time, may reduce their structural integrity.

To improve blade structural integrity, a blade cooling scheme is typically incorporated into the turbines. The blade cooling scheme is included to maintain the blade temperatures within acceptable limits. In some cases, the blade cooling scheme directs cooling air through an internal cooling circuit formed in the blade. The internal cooling circuit may include a simple channel extending through a length of the blade or may consist of a series of connected, serpentine cooling passages, which incorporate raised or depressed structures therein. The serpentine cooling passages increase the cooling effectiveness by extending the length of the air flow path. In this regard, the blade may have multiple internal walls that form the intricate cooling passages through which the cooling air flows.

As the desire for increased engine efficiency continues to rise, engine components are increasingly being subjected to higher and higher operating temperatures. For example, newer engine designs may employ operating temperatures that are over 1100° C. However, current engine components, such as platforms of the blade, may not be adequately designed to withstand such temperatures over time. Hence, designs for improving cooling of the blade platforms may be desired.

Accordingly, it is desirable to have an improved turbine blade including a platform that is suitable for use in operating temperatures greater than 1100° C. In addition, it is desirable for the improved turbine blade to be relatively simple and inexpensive to manufacture. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine blade assemblies and methods of manufacturing turbine blade assemblies are provided.

In an embodiment, by way of example only, a turbine blade assembly includes an airfoil, a platform, and a first cover plate. The airfoil includes a convex suction side wall, a concave pressure side wall, a leading edge, a trailing edge, a root, and a tip, and the convex suction side wall, the concave pressure side wall, and the tip each include an interior surface defining an internal cooling circuit. The platform includes a platform center flow path, a first side, a second side, an edge, a first passage, and a first groove, wherein the platform center flow path extends through the platform in communication with the internal cooling circuit, the airfoil extends from the first side of the platform, the second side of the platform is located opposite the platform from the first side of the platform, the edge of the platform extends between the first side of the platform and the second side of the platform, the first passage of the platform is formed between the first side of the platform and the second side of the platform and includes a first inlet and a first outlet, the first passage of the platform extends from the platform center flow path toward the edge of the platform, and the first groove of the platform is formed on the second side of the platform and extends from the first outlet of the first passage of the platform toward the edge of the platform. The first cover plate is disposed over the second side of the platform covering the first groove of the platform.

In another embodiment, by way of example only, a method of manufacturing turbine blade assemblies includes casting a turbine blade including an airfoil and a platform, wherein the airfoil includes a convex suction side wall, a concave pressure side wall, a leading edge, a trailing edge, a root, and a tip, the convex suction side wall, the concave pressure side wall, and the tip each includes an interior surface defining an internal cooling circuit, and the platform includes a first side, a second side, an edge, and a center flow path, the airfoil extends from the first side of the platform, the second side of the platform is located opposite the platform from the first side of the platform, the edge of the platform extends between the first side of the platform and the second side of the platform, and the platform center flow path is in communication with the internal cooling circuit, forming a first groove on the second side of the platform, forming a first passage through the platform, the first passage extending from the first groove of the platform to the platform center flow path, and disposing a first cover plate over the second side of the platform covering the first groove of the platform

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
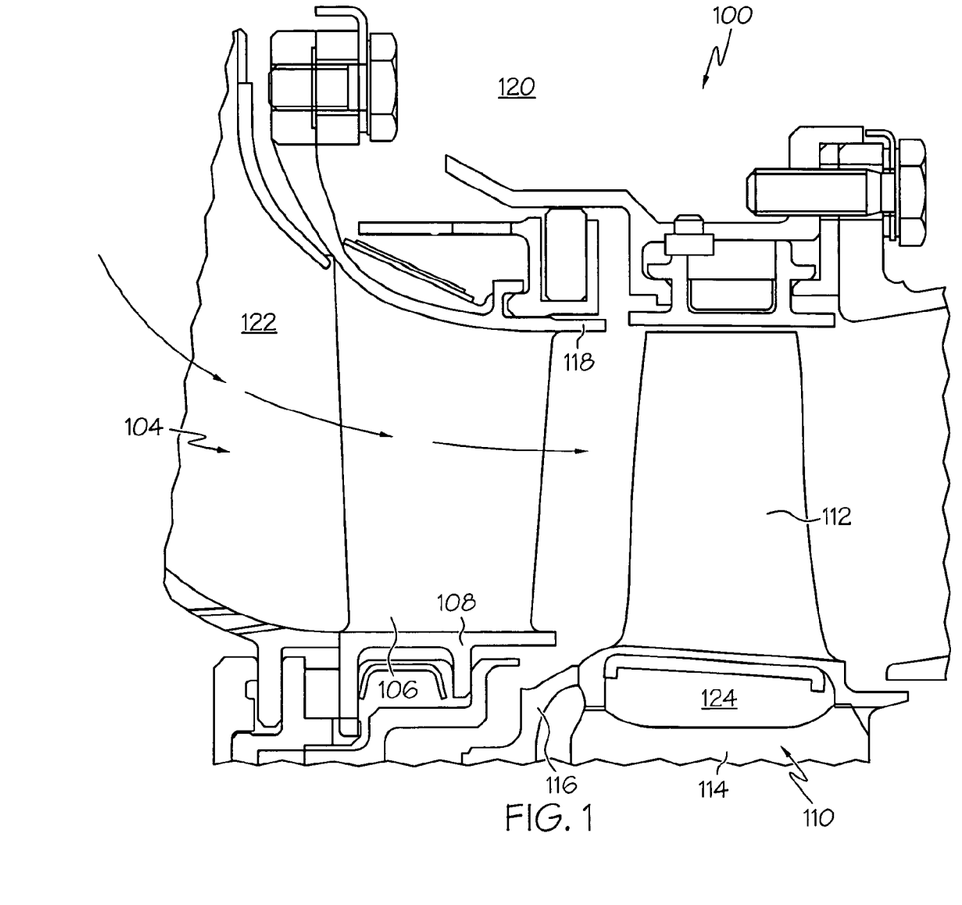
FIG. 1 is a cross-sectional side view of a portion of a turbine section of an engine, according to an embodiment.

FIG. 1 is a cross-sectional side view of a portion of a turbine section 100 of an engine, according to an embodiment. The turbine section 100 receives high temperature (e.g., a temperature greater than 1100° C.) gases from an upstream engine combustor (not shown) to produce energy for the engine and/or components coupled to the engine. In an embodiment, the turbine section 100 includes a turbine nozzle 104 that has a plurality of static vanes 106 mounted circumferentially around a ring 108. The static vanes 106 direct the gases from the combustor to a turbine rotor 110. According to an embodiment, the turbine rotor 110 includes a plurality of blades 112 (only one of which is shown) that are attached to a hub 114 and retained in axial position by a retention plate 116. When the blades 112 are impinged upon by the gases, the gases cause the turbine rotor 110 to spin. According to an embodiment, an outer circumferential wall 118 surrounds the static vanes 106 and the plurality of blades 112 to define a flowpath 122. The circumferential wall 118 also defines a portion of a compressor discharge plenum 120 that is disposed radially outwardly relative to the flowpath 122. The compressor discharge plenum 120 receives bleed air from a compressor section (not shown), which may be directed through one or more openings in the outer circumferential wall 118 towards the plurality of blades 112 to cool the blades 112.

Figure 2:
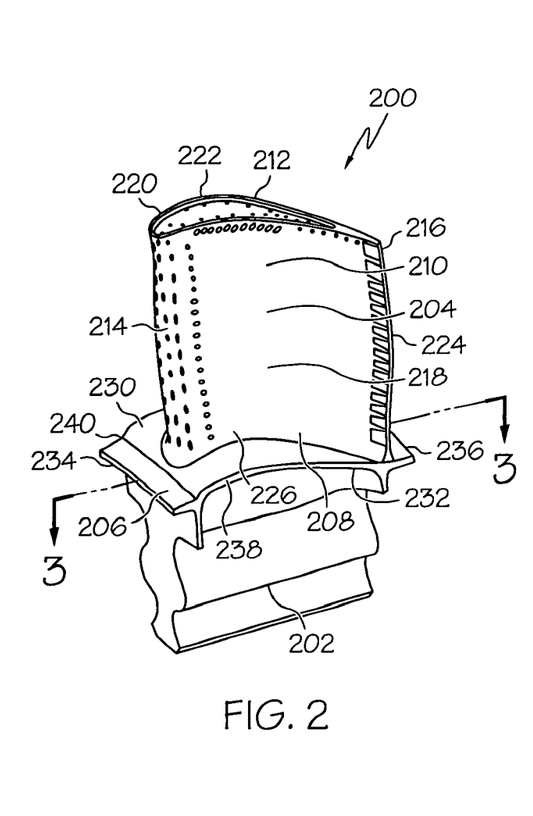
FIG. 2 is a perspective view of a blade, according to an embodiment.

FIG. 2 is a perspective view of a blade 200, according to an embodiment. The blade 200 may be implemented into a turbine rotor (e.g., turbine rotor 110 in FIG. 1) and may comprise a single crystal blade including a nickel-based superalloy, in an embodiment. Suitable nickel-based superalloys include, but are not limited to, MAR-M-247EA, MAR-M-247DS, or SC180. In other embodiments, the blade 200 may comprise a different superalloy. According to an embodiment, the blade 200 may be cast as an equiaxed, directionally solidified, or single crystal blade.

The blade 200 includes a blade attachment section 202, an airfoil 204, and a platform 206. The blade attachment section 202 provides an area in which a shape is machined. In an embodiment, the shape corresponds with a shape formed in a respective blade attachment slot (not shown) of the turbine hub (e.g., hub 114 in FIG. 1). For example, in some embodiments, the shape may be a firtree shape. In other embodiments, the shape may be a beveled shape. However, in other embodiments, any one of numerous other shapes suitable for attaching the blade 200 to the turbine may be alternatively machined therein.

The airfoil 204 has a root 208 and two outer walls 210, 212. The root 208 is attached to the platform 206 and each outer wall 210, 212 has outer surfaces that define an airfoil shape. The airfoil shape includes a leading edge 214, a trailing edge 216, a pressure side 218 along the first outer wall 210, a suction side 220 along the second outer wall 212, a tip 222, a pressure side discharge trailing edge slot 224, and an airfoil platform fillet 226. Though not shown, the blade 200 may have an internal cooling circuit formed therein, which may extend from an opening in the platform 206 through the blade 200 and may include various passages that eventually communicate with the trailing edge slot 224 or other openings (not shown) that may be formed in the blade 200. In particular, the convex suction side wall 212, the concave pressure side wall 210, and the tip 222 each include interior surfaces defining the internal cooling circuit.

In addition to serving as a base from which the airfoil 204 extends, the platform 206 may include surfaces that define flowpaths along which air flows through the engine. According to an embodiment, the platform 206 has a first side 230, a second side 232, a forward edge 234, an aft edge 236, and side edges 238, 240. The first side 230 includes the airfoil 204 and defines a flowpath along which the hot gases travel across a turbine rotor to which the blade 200 is attached (e.g., turbine rotor 110 in FIG. 1). The second side 232 is located on the platform 206 opposite from the first side 230 and includes the blade attachment section 202. In an embodiment, the second side 232 may define a cavity 124 (FIG. 1) with the hub 114 (FIG. 1). In other embodiments, the second side 232 may abut an outer surface of the hub 114.

The forward edge 234, the aft edge 236, and the side edges 238, 240 extend between the first and second sides 230, 232. The side edges 238, 240 are contoured to correspond with side edges (not shown) of adjacent blades. In an embodiment, the side edges 238, 240 may be beveled, and each edge 238, 240 may include a first portion that is contoured to contact an adjacent blade and a second portion that does not contact the adjacent blade.

Figure 3:
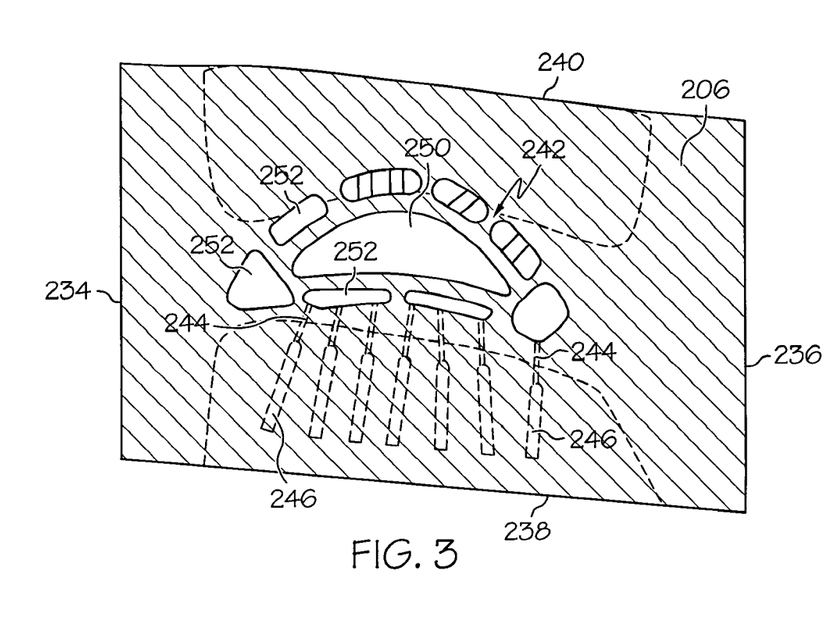
FIG. 3 is a cross-sectional view of the blade of FIG. 2 taken along line 3-3, according to an embodiment.

To cool the platform 206, a cooling scheme may be included in the platform 206. FIG. 3 is a cross-sectional view of the platform 206 of the blade 200 of FIG. 2 taken along line 3-3, according to an embodiment. In particular, the cross section of the platform 206 is taken through the edges 234, 236, 238, 240. In accordance with an embodiment, the cooling scheme may include a center flow path 242, a plurality of passages 244, and a plurality of grooves 246, each formed in the platform 206. Additionally, the cooling scheme may include a cover plate 448 (shown in FIG. 5), which will be described in further detail below.

According to an embodiment, the center flow path 242 is in flow communication with a flow path that may be formed through the hub (e.g., hub 114), which may receive cool air either from a cooled air source or from compressor discharge. The center flow path 242 extends through the platform 206 so that the flow path 242 may be in flow communication with the internal cooling circuit of the airfoil. In some embodiments, the center flow path 242 may comprise a portion of the internal cooling circuit of the airfoil. In accordance with an embodiment, the center flow path 242 may include a main flowpath 250. In another embodiment, the center flow path 242 may additionally include ancillary flowpaths 252 that are formed around the main flowpath 250. The ancillary flowpaths 252 may communicate with the internal cooling circuit, in an embodiment. In another embodiment, a particular configuration of the main flow path 250 and the ancillary flowpaths 252 may depend on configurations of cooling circuits that are included in the internal cooling circuit of the airfoil.

In any case, the center flow path 242 is configured to provide air to the plurality of passages 244 and grooves 246 formed in the platform 206. Each groove 246 extends from a corresponding passage 244. As used herein, the term "passage" may be defined as a channel that is closed on all side, and the term "groove" may be defined as a channel that is open on one side. The term "channel", as used herein, includes passages and grooves. In an embodiment, each of passage 244 and groove 246 (e.g., first, second, third, etc . . . ) extends from the center flow path 242 toward a side edge 238. Although the side edge 238 towards which the passages 244 and grooves 246 extend is closest to the concave pressure side wall 210 (FIG. 2), passages and grooves may alternatively and/or additionally extend toward the convex suction side wall 212, in other embodiments. Although seven sets of passages 244 and grooves 246 are illustrated in FIG. 3, fewer or more may be included in other embodiments.

According to an embodiment, the passages 244 and grooves 246 are not parallel to each other; however, in other embodiments, they may be substantially parallel to each other. In an embodiment, the passages 244 may be substantially equally spaced across the platform 206; however, in other embodiments, spacing of the passages 244 may depend on temperatures to which the platform 206 may be subjected and two or more of the passage 244 may be unequally spaced across the platform 206. In an embodiment, a channel (not shown) may connect adjacent grooves 246. In still another embodiment, heat transfer augmentation features (not shown), such as fins or turbulators, may be added to surfaces that define one or more of the grooves.

Figure 4:
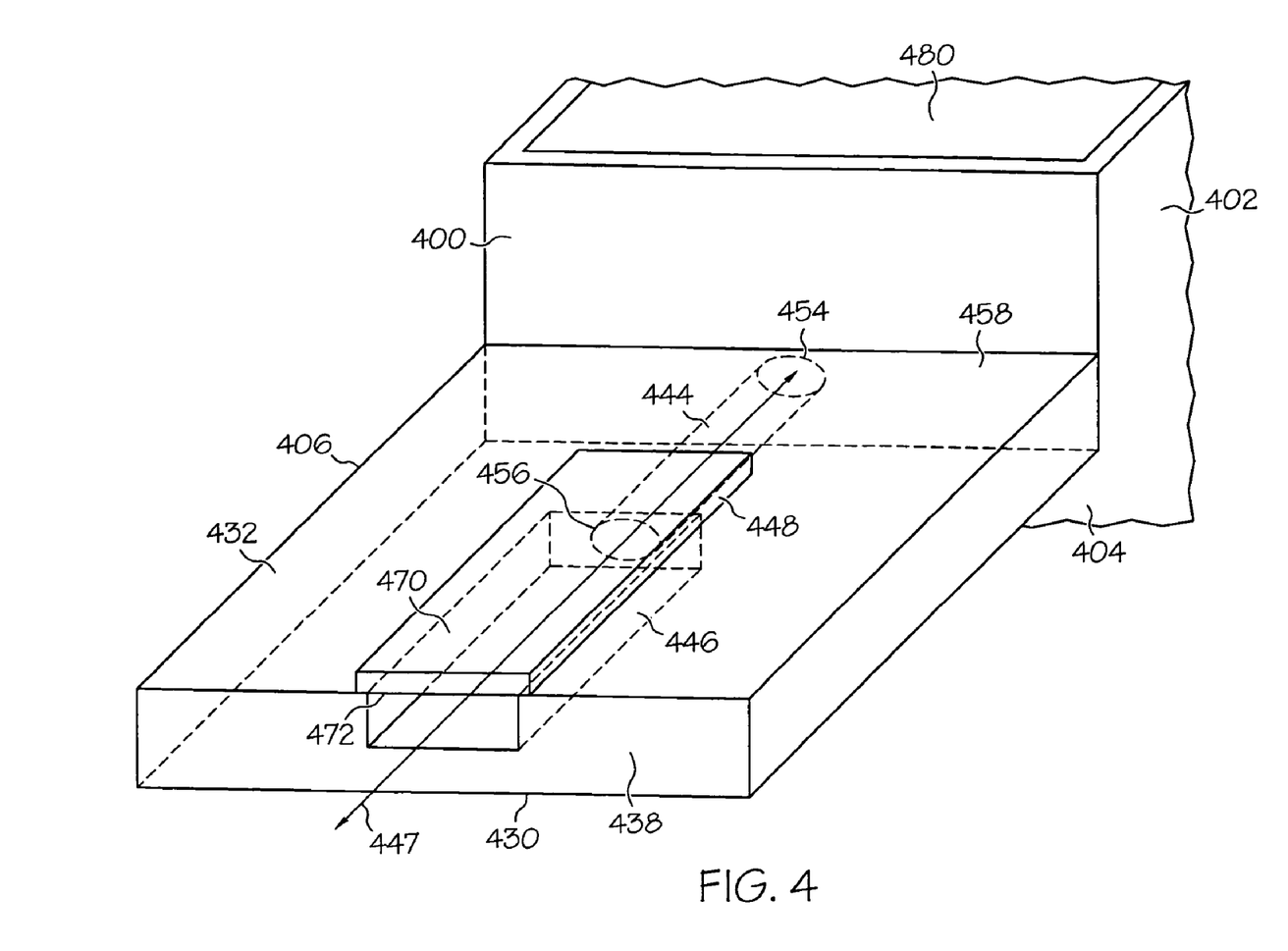
FIG. 4 is a simplified schematic of a platform of a portion of a blade, according to an embodiment.
Figure 5:
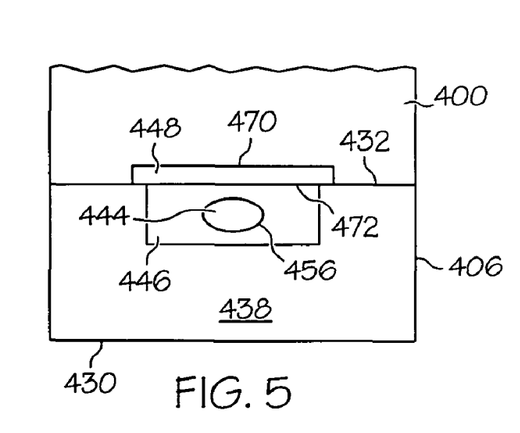
FIG. 5 is an end view of the platform in FIG. 4, according to an embodiment.

FIG. 4 is a simplified schematic of a platform 406 of a portion of a blade 400 and FIG. 5 is an end view of the platform 406, according to an embodiment. Features embedded in the platform 406 and not visible from the surface of the platform in the view presented in FIG. 4 are indicated in phantom. In an embodiment, the platform 406 includes a first side 430 from which an airfoil 404 extends and a second side 432 from which an attachment section 402 extends. The attachment section 402 includes a flowpath 480 that communicates with a platform center flowpath (not shown). The platform 406 includes a passage 444 and a groove 446 that communicates with the passage 444. According to an embodiment, the passage 444 has an inlet 454 and an outlet 456. The inlet 454 is formed on an interior wall 458 defining a portion of the platform center flowpath. The groove 446 is formed in the second side 432 of the platform 406 and extends from the passage outlet 456 to a side edge 438 of the platform 406.

According to an embodiment, the passage 444 has a radial cross section that is substantially ovular in shape; however, in other embodiments, the passage 444 may have a circular, square, rectangular, or alternative radial cross-sectional shape. In accordance with an embodiment, the groove 446 has a substantially rectangular radial cross section, but in other embodiments, the groove 446 may have a square, semi-ovular, semi-circular, or alternative radial cross-sectional shape. In another embodiment, the radial cross section along the length of the passage 444 is smaller than the radial cross section along the groove 446. For example, a largest radial cross section of the passage 444 may be in a range of from about 0.38 mm to about 1 mm, and a largest radial cross section of the groove 446 may be in a range of from about 0.38 mm to about 1.5 mm. In other embodiments, the radial cross sections may be greater or less than the aforementioned ranges. In still other embodiments, the radial cross section of the passage 444 may be larger than that of the groove 446, or may be substantially equal in size as that of the groove 446. In accordance with an embodiment, the radial cross section on the passage 444 may have a substantially constant size and shape along its length, and the radial cross section of the groove 446 may also have a substantially constant size and shape along its length. In other embodiments, the sizes and shapes may vary along the lengths of the passage 444 and groove 446. Additionally, in an embodiment, the passage 444 may have a length in a range of from about 0.5 mm to about 2.0 mm, and the groove 446 may have a length in a range of from about 1 mm to about 15 mm. In other embodiments, the lengths may be greater or less than the aforementioned ranges. In still other embodiments, the lengths of the passage 444 and groove 446 may be substantially equal to each other. In yet other embodiments, the lengths of the passage 444 and groove 446 may be unequal to each other. In accordance with another embodiment, the passage 444 and groove 446 extend along a single axis 447. In another embodiment, the passage 444 and groove 446 may be angled relative to each other. For example, primary axes of the passage 444 and groove 446 may form an angle in a range of from about 0° to about 90°. In another embodiment, the angle may be greater or less than the aforementioned range.

Figure 6:
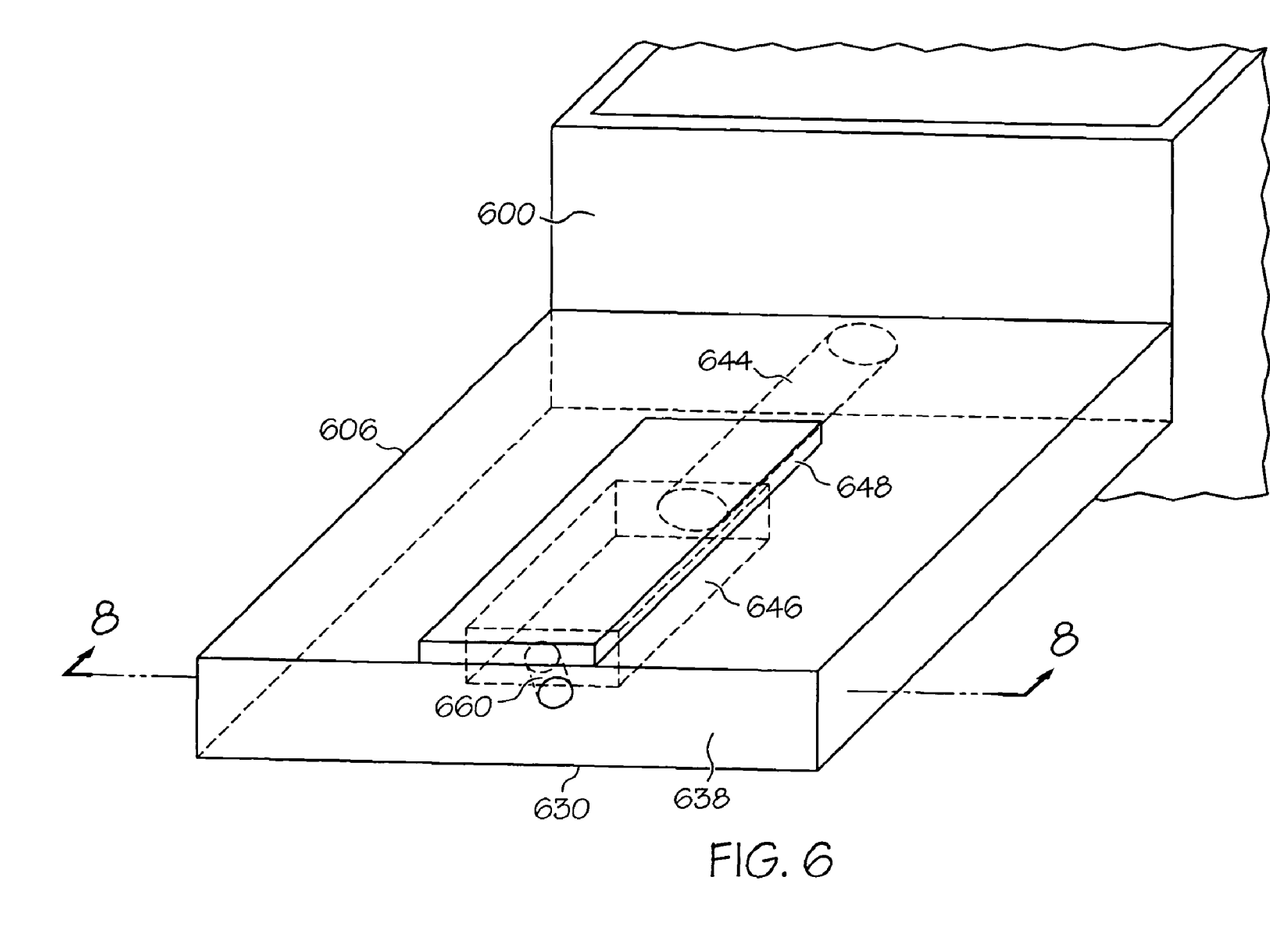
FIG. 6 is a simplified schematic of a platform of a portion of a blade, according to another embodiment.
Figure 7:
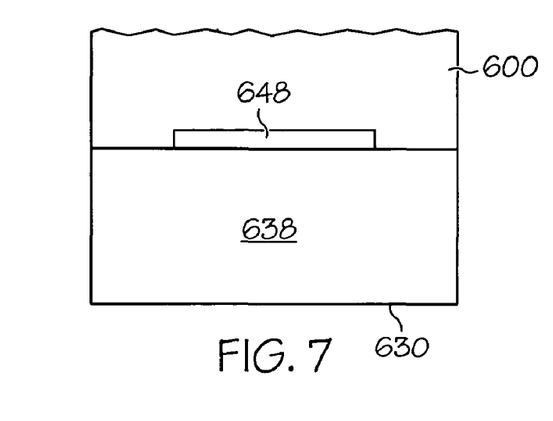
FIG. 7 is an end view of the platform in FIG. 6, according to an embodiment.
Figure 8:
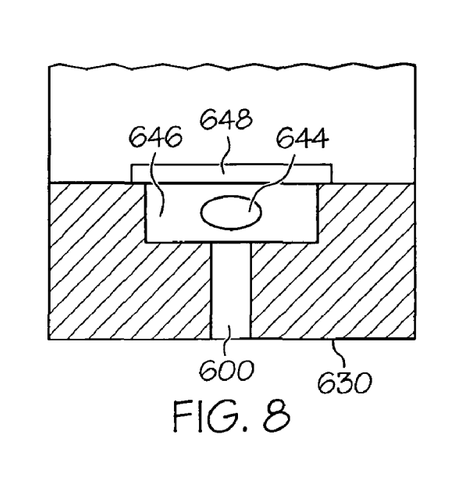
FIG. 8 is a cross-sectional view of the platform in FIG. 6 taken along line 8-8, according to an embodiment.

In an embodiment, the groove 446 terminates at the side edge 438. Thus, air flowing along the groove 446 may exit the platform 406 from the side edge 438. However, this may not be the case in other embodiments. FIG. 6 is a simplified schematic of a platform 606 of a portion of a blade 600, and FIGS. 7 and 8 are an end view and a cross-sectional views of the platform 606 taken along line 8-8, according to an embodiment. Features embedded in the platform 606 and not visible from the surface of the platform in the view presented in FIG. 6 are indicated in phantom. The platform 606 is substantially similar to platform 406 of FIGS. 4 and 5 and includes a passage 644 and groove 646 similar to passage 444 and groove 446 of FIGS. 4 and 5, except groove 646 terminates at a location adjacent to the side edge 638. In an embodiment, the groove 646 terminates at a location that is in a range of between about 0.5 mm to about 1.5 mm away from the side edge 638. In order to allow air flowing along the groove 646 to exit the platform 606, an exit hole 660 (FIGS. 6 and 8) may be included that extends from the groove 646 to a first side 630 of the platform 606 from which an airfoil 604 extends. The exit hole 660 may have a diameter in a range of from about 0.3 mm to about 1 mm, in an embodiment. In other embodiments, the diameter of the exit hole 660 may be greater or less than the aforementioned range. In an embodiment, the diameter of the exit hole 660 may be substantially similar to the radial cross-sectional area of the groove 646. In another embodiment, the exit hole 660 diameter may be smaller than the radial cross-sectional area of the groove 646. In yet another embodiment, more than one exit hole 660 may be incorporated along the length of the groove 646.

In any case, with reference to FIGS. 4-8, a cover plate 448 (in FIGS. 4 and 5), 648 (in FIGS. 6-8) is disposed over the groove 446, 646. In an embodiment, the cover plate 448, 648 extends over substantially an entirety of the groove 446, 646. According to an embodiment, the cover plate 448, 648 may have a length and a width that are greater than the length and width of the groove 446, 646. For simplicity, features of the cover plate will be described as applied to cover plate 448, however, it will be appreciated that the features may also be incorporated into cover plate 648 or into other cover plates. In this regard, turning back to FIGS. 4 and 5, in an embodiment, the cover plate 448 has a first side 470 that is contoured such that a portion is disposed over the groove 446; thus, the portion has a length and width that is larger than the length and width of the groove 446, while a second side 472 of the cover plate 448 may have a protrusion that has a length and width that is smaller than that of the groove 446. In such an embodiment, a thickness of the cover plate 448 may vary and may be in a range of from about 0.2 mm to about 0.8 mm. In another embodiment, the cover plate 448 may have a substantially uniform thickness across its entirety, and the thickness may be in a range of from about 0.2 mm to about 0.8 mm. In still another embodiment, the cover plate 448 may extend over a portion of the groove 446, 646, and thus, may have a length that is slightly smaller than the length of the groove 446.

The cover plate 448 may comprise a material that is capable of maintaining its structural integrity when exposed to temperatures above 380° C. In an embodiment, a suitable material includes, but is not limited to, Haynes 188. In another embodiment, the cover plate 448 may comprise a seal and may include one or more materials, such as a metal, and/or ceramic material. The seal may be disposed in a cavity (e.g., cavity 124 in FIG. 1) formed between the platform 406 and the hub 114 (FIG. 1) and positioned over the groove 446. Thus, when the blade (e.g., blade 200) including the groove 446 is attached to the hub 114 and rotated, centrifugal forces cause the cover plate 448 to move radially outwardly to thereby seal the groove 446.

Although a single cover plate 448, 648 is shown in FIGS. 4-8, more may alternatively be included. For example, in embodiments in which more than one set of passages and grooves is included, such as shown in FIG. 2, each groove (e.g., a second groove, a third groove, and so on) may include a corresponding cover plate. Alternatively, a single cover plate may be employed to cover multiple grooves or all of the grooves.

Figure 9:
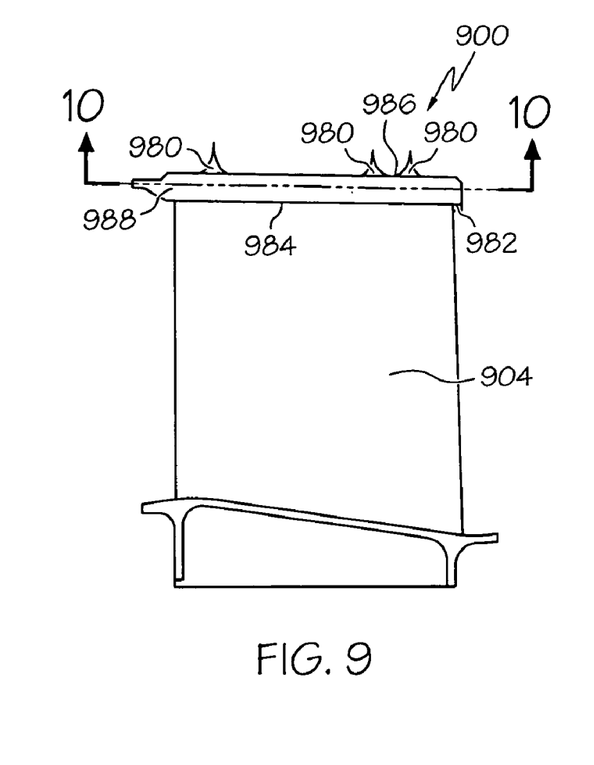
FIG. 9 is a cross-sectional side view of a turbine blade, according to another embodiment.

In another embodiment, the cooling scheme may be implemented into other parts of a blade in which cooling may be desired. FIG. 9 is a cross-sectional view of a turbine blade 900, according to another embodiment. The turbine blade 900 is similar to turbine blade 200 in FIG. 2, except that blade 900 includes a tip shroud 980. According to an embodiment, the tip shroud 980 is formed at a tip 982 of an airfoil 904 of the blade 900 and includes a tip shroud flow path 1010 (FIG. 10), a first side 984, a second side 986, and at least a side edge 988. The tip shroud flow path 1010 is formed in an interior of the tip shroud 980 and is defined at least partially by the first and second sides 984, 986. The airfoil 904 extends from the first side 984 of the tip shroud 980. The second side 986 of the tip shroud 980 is located on the tip shroud 980 opposite from the first side 984, and the side edge 988 extends between the first and second sides 984, 986 of the tip shroud 980.

Figure 10:
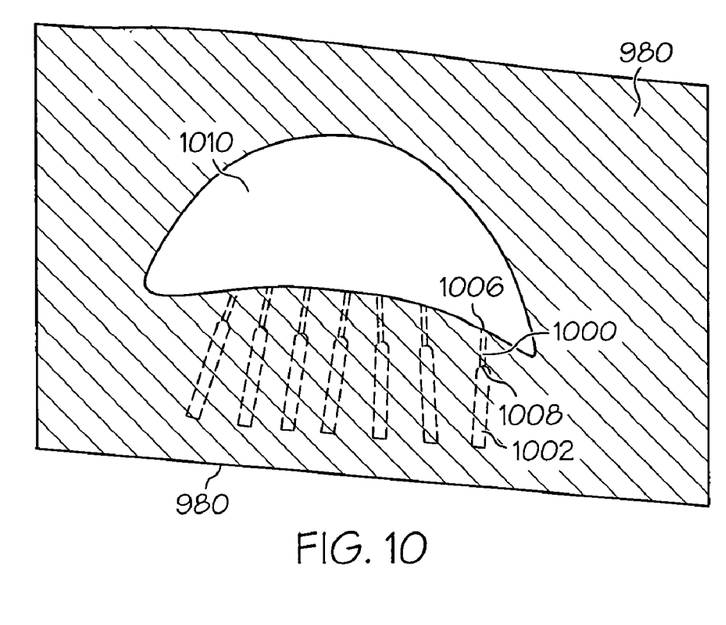
FIG. 10 is a cross-sectional view of a tip shroud of the blade of FIG. 9 taken along line 10-10, according to an embodiment.

In an embodiment, a portion of the cooling scheme additionally or alternatively may be included in the tip shroud 980. FIG. 10 is a cross-sectional view of the tip shroud 980 of the blade 900 of FIG. 9 taken along line 10-10, according to an embodiment. In this regard, the tip shroud 980 may include passages and grooves that are substantially similar to those shown and described in FIGS. 4-8. Thus, the tip shroud 980 may include at least a first passage 1000 formed between the first side 984 of the tip shroud 980 and the second side 986 of the tip shroud 980 and including a first inlet 1006 and a first outlet 1008, the first passage 1000 of the tip shroud 980 extending from a tip shroud flow path 1010 toward the edge 988 of the tip shroud 980. A first groove 1002 of the tip shroud 980 may be formed on the second side 986 of the tip shroud 980 and extend from the first outlet 1008 of the first passage 1000 of the tip shroud 980 toward the edge 988. Additionally, a cover plate (not shown) may be disposed over the second side 986 of the tip shroud 980 and over the groove 1002. The cover plate may be configured substantially similar to cover plates 448 and 668 described above in conjunction with FIGS. 4-8.

Figure 11:
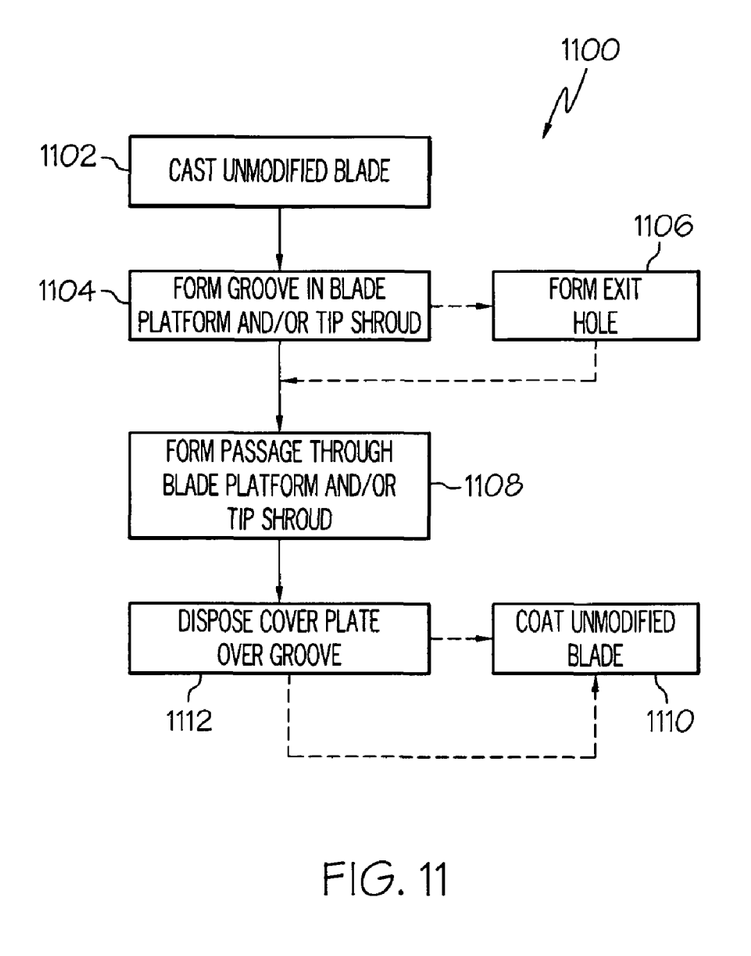
FIG. 11 is a flow diagram of a method of manufacturing a turbine blade, according to an embodiment.

FIG. 11 is a flow diagram of a method 1100 of manufacturing a turbine blade, such as turbine blade 200 in FIG. 2 or turbine blade 900 in FIG. 9, according to an embodiment. In accordance with an embodiment, an unmodified turbine blade is cast, step 1102. As used herein, the term "unmodified turbine blade" is a blade that does not include a cooling scheme in its platform and/or tip shroud. According to an embodiment, the unmodified turbine blade may be formed as a single piece. For example, the unmodified turbine blade may be formed by a lost wax casting process or an investment casting process. In other embodiments, machining processes may be used to machine the unmodified turbine blade into a desired shape. Alternatively, other formation processes may be employed. The unmodified turbine blade may be made from materials, such as the materials mentioned above for turbine blade 200 (FIG. 2). In another embodiment, the turbine blade is cast to include an airfoil and a platform, the airfoil including a convex suction side wall, a concave pressure side wall, a leading edge, a trailing edge, a root, and a tip, the convex suction side wall, the concave pressure side wall, and the tip each including an interior surface defining an internal cooling circuit, and the platform formed at the root of the airfoil and including a first side, a second side, an edge, and a center flow path, the airfoil extending from the first side of the platform, the second side of the platform located opposite the platform from the first side of the platform, and the edge of the platform extending between the first side of the platform and the second side of the platform, the platform center flow path in communication with the internal cooling circuit. In other embodiments, the turbine blade also may be cast to include a tip shroud formed at the tip of the airfoil, the tip shroud including a first side, a second side, an edge, a first passage, and a first groove, the airfoil extending from the first side of the tip shroud, the second side of the tip shroud located opposite the tip shroud from the first side of the tip shroud, the edge of the tip shroud extending between the first side of the tip shroud and the second side of the tip shroud.

Next, one or more grooves are formed on the second side of the platform and/or on the second side of the tip shroud to form a modified blade, step 1104. In an embodiment, location(s) of the groove(s) are determined by performing a thermal analysis on the unmodified blade configuration, while the blade is subjected to engine operating conditions. The thermal analysis may be performed virtually by using computer-generated data simulating the engine operating conditions and using computer-generated data points representing the unmodified blade configuration. Alternatively, the thermal analysis may be performed on a physical blade formed to include the unmodified blade configuration, and temperature sensors may obtain temperature data from the physical blade, while the blade is subjected to a controlled physical environment in which the engine operating conditions are provided. Data from the thermal analysis may be used to identify locations on the platform and/or the tip shroud (if included) at which temperatures may exceed a predetermined maximum temperature. For example, the predetermined maximum temperature may be in a range of from about 850° C. to about 1100° C. In other embodiments, the predetermined maximum temperature may be greater or less than the aforementioned range. In any case, the grooves and the passages may be formed at or adjacent to the identified locations on the platform and/or the tip shroud (if included).

According to an embodiment, a groove is formed in the platform and/or tip shroud using an electrodischarge machining apparatus. In another embodiment, step 1102 and step 1104 may be performed in a single step. Specifically, the groove(s) may be formed into the platform and/or the tip shroud (if included) as part of a casting process when the unmodified blade is cast. In another example in which a first groove is formed in the platform, a second groove may be formed in the tip shroud. In still another example, seven grooves may be formed. In another embodiment, fewer grooves may be formed in the platform and/or the tip shroud. In another embodiment, more than seven grooves may be formed in the platform and/or the tip shroud. Moreover, some or all of the grooves may extend from an edge of the platform toward the platform center flow path. In addition, or alternatively, some or all of the groove may extend from location adjacent to the edge of the platform toward the platform center flow path. In yet another embodiment, adjacent grooves may be connected by one or more channels. In an embodiment in which the tip shroud is to be configured to include a cooling scheme, the groove may extend from an edge of the tip shroud toward the tip shroud flow path, or alternatively, a groove may extend from a location adjacent to the edge of the tip shroud toward the tip shroud flow path. In any case, the grooves may be configured substantially similarly to grooves 446 (FIGS. 4 and 5), 646 (FIGS. 6-8), and 1002 (FIGS. 9 and 10) described above.

In an embodiment in which a groove extends from a location adjacent to the edge of the tip shroud, an exit hole may be formed in the blade, step 1106. In an embodiment, the exit hole is physically machined using an electrodischarge machining apparatus. In another embodiment, the exit hole may be machined by laser. In yet another embodiment, the exit hole may be chemically etched through the platform and/or tip shroud. In an embodiment, more than one exit hole may be machined into a groove. In accordance with an embodiment, more than one exit hole may be machined into the blade, depending on the number of grooves that are formed in the platform and/or tip shroud. For example, each groove may have a corresponding exit hole. However, in other embodiments, selected grooves may have exit holes and other grooves may not. The exit holes may be configured substantially similarly to exit holes 660 (FIGS. 6-8) described above.

A passage is formed through the platform and/or tip shroud such that the passage extends from a corresponding groove to the platform center flow path and/or the tip shroud flow path, step 1108. In an embodiment, the passage is physically machined using an electrodischarge machining apparatus. In another embodiment, the passage may be chemically etched through the blade. In yet another embodiment, the passage may be machined using laser. The passage may be angled relative to the groove, in an embodiment. Alternatively, the passage may be axially aligned with the groove, in an embodiment. In accordance with an embodiment, more than one passage may be machined into the blade, depending on the number of grooves that are formed in the platform and/or tip shroud. For example, one or more first passages may be formed into the platform, and one or more second passages may be formed into the tip shroud. In any case, the passages may be configured substantially similar to passages 444 (FIGS. 4 and 5), 644 (FIGS. 6-8), and 1000 (FIGS. 9-10) described above. Although step 1108 is illustrated in FIG. 11 as occurring after step 1106, steps 1106 and 1108 may be performed in any order. In still another embodiment, step 1108 may be omitted. In such case, a groove may not have a corresponding passage and instead, one or more channels may be formed between two grooves so that the groove without the corresponding passage may receive cooling air from an adjacent groove via the one or more channels.

One or more cover plates are disposed over the second side of the platform and/or tip shroud thereby covering the one or more grooves, step 1112. According to an embodiment, a cover plate may be configured substantially similar to cover plates 448, 648 (FIGS. 5 and 6-8) described above. In this regard, a cover plate may be cast using a process substantially similar to the process described for step 1102. In another embodiment, a cover plate may be a metal alloy sheet, which is cut into a particular shape. In still another embodiment, a cover plate may be part of another component in the blade, such as a bath tub seal located inside the cavity 124.

In accordance with an embodiment, a cover plate may be bonded to the platform and/or tip shroud to maintain the cover plate in position. In embodiments in which a single cover plate is employed, the cover plate is placed over all of the grooves. In embodiments in which cover plate are included for each groove or less than all of the grooves, each cover plate is disposed over one or more corresponding grooves. A cover plate may be brazed to the blade with a braze alloy, in an embodiment. Suitable braze alloys may include, but are not limited to nickel base brazing filler AMS 4775/4776. In yet another example, a cover plate may be spot welded to the blade. In embodiments in which a cover plate has a configuration substantially similar to a seal, the cover plate may not include bonding, and instead, may simply be placed over corresponding grooves and is pressed onto one or more of the grooves by centrifugal force generated by the blade rotation.

In an embodiment, a protective coating may be deposited onto the modified turbine blade, step 1110. In accordance with an embodiment, the protective coating may be provided after the cover plate is welded into place, (e.g., after step 1112). In an alternative embodiment in which the cover plate is not bonded and is simply placed over the groove, the protective coating may be provided before the cover plate is disposed over the groove. In any case, the protective coating includes one or more layers serving as an environmental barrier, an oxidation-resistant coating, or a thermal barrier layer. In an embodiment, an entirety of the modified turbine blade may be coated with the layers. Alternatively, desired portions of the modified turbine blade, such as the airfoil or certain surfaces of the airfoil, may include the layers.

The layers may be deposited in a desired sequence using known techniques, such as plasma spray, cold-gas spray, electron-beam physical vapor deposition, chemical vapor deposition, and the like. In other embodiments, the layers may be deposited using a different process. Each layer may be deposited to a thickness in a range of from about 0.02 mm to about 1.0 mm. In other embodiments, the thickness may be greater or less than the aforementioned range. In accordance with an embodiment, the thermal barrier layer may be deposited over the modified turbine blade as an outermost layer, while other layers, such as environmental protection layers, may be deposited prior to the deposition of the thermal barrier layer. To improve bonding between the outermost layer (e.g., the thermal barrier layer) and the modified turbine blade, a bond coat may be applied prior to depositing the thermal barrier layer. The bond coat may include oxidation-resistant coatings and diffusion coatings.

Figure 12:
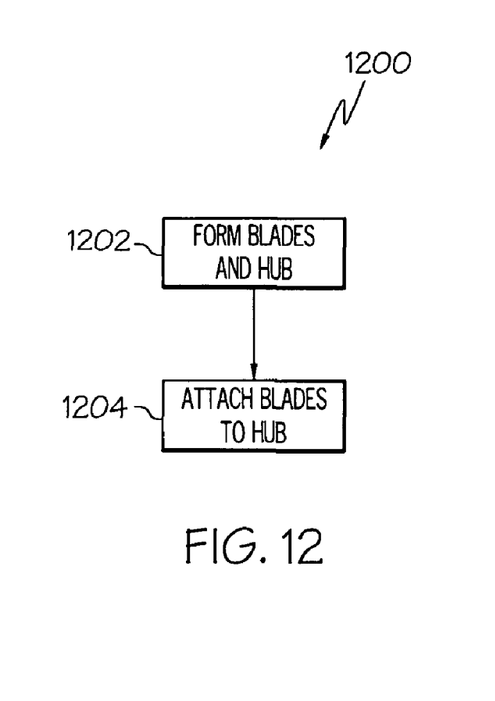
FIG. 12 is a flow diagram of a method of manufacturing a turbine rotor, according to an embodiment.

FIG. 12 is a flow diagram of a method 1200 of manufacturing a turbine rotor, according to an embodiment. In an embodiment, the blades and a hub are formed, step 1202. In an embodiment, the blades are formed according to method 1100 described above. According to another embodiment, the hub is forged using a conventional forging process. In an example, the hub is forged into an equiaxed nickel-based superalloy component. In another example, the hub may be manufactured from a powder metal nickel superalloy. In any case, the hub and the blades may include substantially identical materials, in an embodiment. In other embodiments, the hub and the blades may be made of different materials. The number of blades included in the turbine rotor depends on a size of the hub and a number of blade attachment slots that may be formed in the hub. In one example, the hub may include thirty-eight blade attachment slots, and thirty-eight blades are included. In other embodiments, more or fewer slots and blades may be included.

After the blades and hub are formed, the blades are attached to the hub, step 1204. In an embodiment, the blades are inserted into corresponding attachment slots of the hub. In another embodiment, the cast blades or blade ring may be metallurgically bonded to the hub to form the turbine rotor. In an embodiment in which the blades include one or more cover plates to be disposed over the grooves, the cover plate may be retained against the platform via components surrounding the turbine blade, such as via a retention plate (e.g., retention plate 116 of FIG. 1) or via adjacent turbine blades. Thus, the cover plates may be disposed in corresponding cavities formed between platforms of adjacent blades and the hub.

By including turbine blades having platform and/or tip shroud cooling schemes such as those described above, cooling air may flow through a blade and into a platform and/or tip shroud. Specifically, during engine operation, cool air originating from a compressor stage or other coolant source flows through the engine and through openings formed in the hub. The cool air travels along flow paths formed in the hub and through an opening formed in a blade attachment section of the blade. The cool air then flows along a platform center flowpath in the platform of the blade and is distributed among the one or more passages in the platform and subsequently flows along the grooves and exits from the edge or from a location adjacent to the edge of the platform. In this way, the blade platform and/or tip shroud may be cooled by convection cooling, rather than impingement cooling. "Convection cooling", as used herein, may be defined as a heat transfer mechanism corresponding to air flow substantially along a longitudinal axis of the passage and groove. "Impingement cooling", as used herein, may be defined as a heat transfer mechanism which utilizes the impingement action of air jet onto a target surface in which the air jet is usually oriented substantially perpendicular to the target surface. Convection cooling is advantageous over impingement cooling in some situations because cross flow effects, which degrade the impingement heat transfer, is generally absent in convection cooling. As a result, the blade platform cooling design may be simpler for blades that operate at temperatures greater than 1100° C. compared to an impingement cooled turbine blade. platform.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine blade assembly comprising:
    an airfoil including a convex suction side wall, a concave pressure side wall, a leading edge, a trailing edge, a root, and a tip, the convex suction side wall, the concave pressure side wall, and the tip each including an interior surface defining an internal cooling circuit;
    a platform including a platform center flow path, a first side, a second side, an edge, a first passage, and a first groove, wherein the platform center flow path extends through the platform in communication with the internal cooling circuit, the airfoil extends from the first side of the platform, the second side of the platform is located opposite the platform from the first side of the platform, the edge of the platform extends between the first side of the platform and the second side of the platform, the first passage of the platform is formed between the first side of the platform and the second side of the platform and includes a first inlet and a first outlet, the first passage of the platform extends from the platform center flow path toward the edge of the platform, and the first groove of the platform is formed on the second side of the platform and extends from the first outlet of the first passage of the platform toward the edge of the platform;
    a tip shroud formed at the tip of the airfoil, the tip shroud including a tip shroud flow path, a first side, a second side, an edge, a second passage, and a second groove, wherein the airfoil extends from the first side of the tip shroud, the tip shroud flow path extends through the tip shroud, the second side of the tip shroud is located opposite the tip shroud from the first side of the tip shroud, the edge of the tip shroud extends between the first side of the tip shroud and the second side of the tip shroud, the second passage of the tip shroud is formed between the first side of the tip shroud and the second side of the tip shroud, the second passage of the tip shroud extends from the tip shroud flow path toward the edge of the tip shroud, and the second groove of the tip shroud is formed on the second side of the tip shroud and extends from the second passage of the tip shroud toward the edge of the tip shroud;
    a first cover plate disposed over the second side of the platform covering the first groove of the platform; and
    a second cover plate disposed over the second side of the tip shroud and over the second groove of the tip shroud.

2. The turbine blade assembly of claim 1, wherein the first groove of the platform terminates at the edge of the platform.

3. The turbine blade assembly of claim 1, wherein the platform includes an exit hole extending from the first side of the platform to the first groove of the platform.

4. The turbine blade assembly of claim 3, wherein the first groove of the platform terminates adjacent to the edge of the platform.

5. The turbine blade assembly of claim 1, wherein the first passage of the platform has a first radial cross section, and the first groove of the platform has a second radial cross section that is larger than the first radial cross section.

6. The turbine blade assembly of claim 1, wherein the first passage of the platform and the first groove of the platform extend away from the concave pressure side wall of the airfoil.

7. The turbine blade assembly of claim 1, wherein the platform further includes a second passage and a second groove, the second passage is formed between the first side of the platform and the second side of the platform, the second passage of the platform extends from the platform center flow path toward the edge of the platform, and the second groove of the platform is formed on the second side of the platform and extends from the second passage of the platform toward the edge of the platform.

8. The turbine blade assembly of claim 7, wherein the first passage of the platform and the second passage of the platform are not parallel relative to each other.

9. The turbine blade assembly of claim 1, wherein the first cover plate comprises a seal.

10. A method of manufacturing a turbine blade assembly, the method comprising the steps of:
   casting a turbine blade including an airfoil and a platform, wherein the airfoil includes a convex suction side wall, a concave pressure side wall, a leading edge, a trailing edge, a root, and a tip, the convex suction side wall, the concave pressure side wall, and the tip each includes an interior surface defining an internal cooling circuit, and the platform includes a first side, a second side, an edge, and a center flow path, the airfoil extends from the first side of the platform, the second side of the platform is located opposite the platform from the first side of the platform, the edge of the platform extends between the first side of the platform and the second side of the platform, and the platform center flow path is in communication with the internal cooling circuit;
   identifying a first location on the platform having a first temperature measurement that is greater than a pre-determined temperature, when the turbine blade is subjected to operating conditions of an engine;
   forming a first groove on the second side of the platform;
   forming a first passage through the platform and adjacent to the first location, the first passage extending from the first groove of the platform to the platform center flow path; and
   disposing a first cover plate over the second side of the platform covering the first groove of the platform.

11. The method of manufacturing a turbine blade assembly of claim 10, further comprising the step of:
   forming an exit hole through the first side of the platform to the first groove.

12. The method of manufacturing a turbine blade assembly of claim 10, wherein the step of forming the first groove comprises forming the first groove to extend between the edge of the platform and the platform center flowpath.

13. The method of manufacturing a turbine blade assembly of claim 10, wherein the step of forming the first groove comprises forming the first groove to extend between a location adjacent to the edge of the platform and the platform center flowpath.

14. The method of manufacturing a turbine blade assembly of claim 10, further comprising the steps of:
   forming a second groove on the second side of the platform; and
   forming a second passage through the platform, the second passage extending from the second groove of the platform to the platform center flow path.

15. The method of manufacturing a turbine blade assembly of claim 10, further comprising the step of:
   disposing a second cover plate over the second side of the platform covering the second groove of the platform.

16. The method of manufacturing a turbine blade assembly of claim 10, further comprising the step of:
   disposing the first cover plate over the second side of the platform covering the second groove of the platform.

17. The method of manufacturing a turbine blade assembly of claim 10, further comprising the step of:
   casting a turbine blade having a tip shroud formed at the tip of the airfoil, wherein the tip shroud includes a first side, a second side, an edge, a tip shroud flow path, a first passage, and a first groove, the airfoil extends from the first side of the tip shroud, the second side of the tip shroud is located opposite the tip shroud from the first side of the tip shroud, the edge of the tip shroud extends between the first side of the tip shroud and the second side of the tip shroud, and the tip shroud flow path extends through the tip shroud of the turbine blade and is in communication with the internal cooling circuit, and the method further comprises the steps of
      forming a second groove on the second side of the tip shroud; and
      forming a second passage through the tip shroud, the second passage extending from the second groove of the tip shroud to the tip shroud flow path; and
      disposing a second cover plate over the second side of the tip shroud covering the second groove of the tip shroud.

18. The method of manufacturing a turbine blade assembly of claim 10, further comprising the step of:
   wherein the steps of forming the first groove and forming the first passage comprise electro-discharge machining the first groove and the first passage.

* * * * *